Patented Feb. 3, 1942

2,271,638

UNITED STATES PATENT OFFICE 2,271,638

GERMICIDE

Howard L. Guest, Roseville, Calif., assignor of seventy-five per cent to L. A. Gunther, Robbins, Calif.

No Drawing. Application December 16, 1940, Serial No. 370,419

4 Claims. (Cl. 167—17)

This invention relates to germicides, and has for one of its objects, a germicidal product that is non-caustic and non-injurious to body tissue, and which product is non-toxic in any degree of concentration, and is healing to injured tissue.

This application is a continuation-in-part of my application, Serial No. 364,244, filed November 4, 1940, and now Patent No. 2,209,454.

Another object is a germicide that has a faster killing action on microörganisms, than any other non-caustic germicide of which I am aware and which germicide is considerably more germicidal than phenol and other caustic germicides of which I am aware when used in equivalent solutions.

A still further object is a germicide that may be used in any degree of dilution on injured or uninjured body tissue with perfect safety, and the killing power of which, on microörganisms, whether of the type such as Trycophyton interdigitalis, a fungus, or of the true germ type, such as E. typhi or S. aureus, and which germicide even in a relatively high dilution, will rapidly and positively kill microörganisms having a resistance to killing at least equal to that of Eberthella typhosa, Staphylococcus aures, or Tricophytan tonsuraus.

Other objects and advantages will appear in the following description:

Before describing my germicide and fungicide in detail, it is important to understand that the word "germicide," as used in the description and claims, does not refer to antiseptics that are merely disinfectants or deodorizers, but one that is capable of positively and effectively killing microörganisms such as those already mentioned herein, and which are deemed to be among the most highly resistant to killing. To be effective, it is obvious that a germicide or fungicide must act quickly.

The caustic nature of most germicides prevents their use safely in a concentration suitable for most effectively destroying resistant bacteria in tissue. Also if accidentally taken internally, the results may be fatal to a person, or irreparable injury will generally follow, unless prompt steps are taken to arrest its action on internal tissue. With my germicide, no injury to any tissue can result, whether used on broken tissue or whether taken internally, in which latter instance it merely has an emetic action if a sufficient amount is taken.

Briefly described, my germicide or fungicide product comprises a mixture of one gram molecular weight of ferrous chloride to each two grams molecular weight of ferric chloride. In dry form, this mixture is effective when used on body tissue, there being sufficient moisture on the skin or in the blood to effect the desired result, but in use, it is preferably in a solution of water, alcohol or both. A 40% solution is a concentrated solution, but the preferred solution for a surgical germicide is a 4 to 5% solution of the solid comprising one gram molecular weight ferrous chloride with two grams molecular weight ferric chloride dissolved in from 12 to 13% iso propyl alcohol. The alcohol facilitates penetration, and such solution, tested by standard and approved methods against S. aureus and E. typhi, as directed for testing germicides intended for personal use (Method of Reddish as recommended by American Public Health Association) will kill S. aureus and E. typhi in less than one minute's exposure. A 4% solution, exclusive of the alcohol, will kill these microörganisms in less than four minutes after exposure, and, of course, the killing time is proportionally reduced with an increase in the concentration of the solution.

It is pertinent to note that the substantially exact ratio of one gram molecular weight of $FeCl_2$ to two grams molecular weight of $FeCl_3$ must be maintained in whatever solution is prepared, in order to obtain the desired results. The degree of concentration of the solution, may, of course, vary, according to the strength desired.

While I am aware of the fact that ferric chloride alone has been used before on traumatized tissue as a styptic or as an astringent, according to the authorities (Redeal, Disinfection and Disinfectants, second edition, page 121), it does not kill bacteria, and is condemned. It has no official recognition. Ferrous chloride alone has also been found to be absolutely non-germicidal. Applicant has discovered, however, that the combination of the two in the proportion herein described, produces a non-toxic, non-caustic germicide of materially greater killing power than the combination of ferric sulphate and ferrous sulphate as described in his United States Letters Patent No. 2,209,454, dated July 30, 1940, when used in solutions of the same strength.

While, as already stated herein, the mixture of the iron salts, $FeCl_2$ and $FeCl_3$, in dry form, is germicidal when directly applied to wounds, or to the skin, due to the moisture, the mixture is preferably used in solution, either in water alone, or is dissolved in alcohol, and the water added to produce the desired solution. The alcohol increases the killing action by increasing the rate of absorption of the solution by the microörganisms. Commercially, a mixture of the salts in the proper ratio to each other, may therefore be supplied to physicians or users for preparing the solution desired, or the solution may be supplied already mixed.

Having described my invention, I claim:

1. A non-caustic germicide mixture for solution in $H_2O$ comprising $FeCl_2$ and $FeCl_3$ in the ratio of one gram molecular weight of $FeCl_2$ to each two grams molecular weight of $FeCl_3$.

2. A non-caustic germicidal solution comprising $FeCl_2$ and $FeCl_3$, in the ratio of one gram molecular weight of $FeCl_2$ to each two grams molecular weight of $FeCl_3$ dissolved in water.

3. A non-caustic germicidal solution comprising $FeCl_2$ and $FeCl_3$, in the ratio of one gram molecular weight of $FeCl_2$ to each two grams molecular weight of $FeCl_3$, dissolved in alcohol and water.

4. A non-caustic germicidal solution comprising a 4% to 5% solution of $FeCl_2$ and $FeCl_3$ in which the liquid is $H_2O$ and alcohol, the said alcohol being from 12% to 13% by weight of the total amount of liquid and there being substantially one gram only, molecular weight, of the $FeCl_2$ to each two grams molecular weight of the $FeCl_3$ in the solution.

HOWARD L. GUEST.